United States Patent
Nakagawa

(10) Patent No.: US 11,500,085 B2
(45) Date of Patent: Nov. 15, 2022

(54) RADAR DEVICE AND TARGET TRACKING METHOD

(71) Applicant: FURUNO ELECTRIC CO., LTD., Hyogo (JP)

(72) Inventor: Kazuya Nakagawa, Hyogo (JP)

(73) Assignee: FURUNO ELECTRIC CO., LTD., Hyogo (JP)

(*) Notice: Subject to any disclaimer, the term of this patent is extended or adjusted under 35 U.S.C. 154(b) by 309 days.

(21) Appl. No.: 16/649,134

(22) PCT Filed: Aug. 21, 2018

(86) PCT No.: PCT/JP2018/030717
§ 371 (c)(1),
(2) Date: Mar. 19, 2020

(87) PCT Pub. No.: WO2019/058836
PCT Pub. Date: Mar. 28, 2019

(65) Prior Publication Data
US 2020/0292693 A1    Sep. 17, 2020

(30) Foreign Application Priority Data

Sep. 22, 2017  (JP) .............................. JP2017-181908

(51) Int. Cl.
*G01S 13/72*      (2006.01)
*G01S 13/937*     (2020.01)
*G08G 3/02*       (2006.01)

(52) U.S. Cl.
CPC .......... *G01S 13/726* (2013.01); *G01S 13/937* (2020.01); *G08G 3/02* (2013.01)

(58) Field of Classification Search
CPC ...... G01S 13/276; G01S 13/937; G01S 13/00; G01S 13/66; G01S 13/72; G01S 13/723;
(Continued)

(56) References Cited

U.S. PATENT DOCUMENTS

2011/0241933 A1* 10/2011 Nishiyama .............. G01S 7/298
                                                    342/179
2012/0007767 A1*  1/2012 Maeno .................. G01S 7/2927
                                                     342/92
(Continued)

FOREIGN PATENT DOCUMENTS

CN     102062854 A  *  5/2011  ............. G01S 13/86
EP     0926511         6/1999
(Continued)

OTHER PUBLICATIONS

Distance Between 2 Points, Jan. 17, 2015, Math is Fun, https://web.archive.org/web/20150117204556/https://www.mathsisfun.com/algebra/distance-2-points.html (Year: 2015).*
(Continued)

*Primary Examiner* — Erin F Heard
*Assistant Examiner* — Kenneth W Good
(74) *Attorney, Agent, or Firm* — JCIPRNET

(57) ABSTRACT

To provide a radar device capable of tracking a target accurately and stably, taking into account the possibility that a plurality of echoes may merge. A radar device is provided with a tracking processing unit, a merging possibility calculating unit and a preliminary handling processing unit. The merging possibility calculating unit calculates an echo merging possibility, which is the possibility that echo merging, whereby a plurality of echoes become integrated, will occur in the future, based on movement information including the position and speed of a target. The preliminary handling processing unit performs an advance handling process, which is a process for handling future occurrences of echo merging, based on the echo merging possibility.

18 Claims, 2 Drawing Sheets

(58) Field of Classification Search
CPC ........ G01S 13/06; G01S 13/20; G01S 13/726; G01S 13/951; G01S 13/953; G01S 13/955; G01S 3/325; G01S 19/26; G08G 3/02

See application file for complete search history.

(56) References Cited

U.S. PATENT DOCUMENTS

| | | | |
|---|---|---|---|
| 2012/0127018 A1* | 5/2012 | Nakagawa | G01S 7/10 342/90 |
| 2012/0127026 A1* | 5/2012 | Matsumoto | G01S 7/064 342/179 |
| 2016/0328118 A1* | 11/2016 | Yoshikawa | G01S 13/937 |
| 2017/0067984 A1 | 3/2017 | Nakahama et al. | |
| 2017/0254894 A1* | 9/2017 | Lemoine | G01S 15/66 |

FOREIGN PATENT DOCUMENTS

| | | | |
|---|---|---|---|
| JP | S59195172 | 11/1984 | |
| JP | H03264880 | 11/1991 | |
| JP | H0836700 | 2/1996 | |
| JP | H09236658 | 9/1997 | |
| JP | 2003132499 | 5/2003 | |
| JP | 2008039557 | 2/2008 | |
| JP | 2012225868 | 11/2012 | |
| JP | 2013217834 | 10/2013 | |
| JP | 2014032016 | 2/2014 | |
| WO | 2016084498 | 6/2016 | |
| WO | WO-2016084498 A1 * | 6/2016 | ........... G01S 13/449 |

OTHER PUBLICATIONS

CN102062854AMT.pdf-DES, WIPO generated machine translation of CN-102062854-A (Year: 2011).*

WO2016084498A1MT.pdf-DES, WIPO generated machine translation of WO-2016084498-A1 (Year: 2016).*

"International Search Report (Form PCT/ISA/210) of PCT/JP2018/030717," dated Nov. 20, 2018, with English translation thereof, pp. 1-4.

"Search Report of Europe Counterpart Application", dated May 10, 2021, p. 1-p. 8.

* cited by examiner

RADAR DEVICE AND TARGET TRACKING METHOD

CROSS-REFERENCE TO RELATED APPLICATION

This application is a 371 application of the International PCT application serial no. PCT/JP2018/030717, filed on Aug. 21, 2018, which claims the priority benefit of Japan Patent Application No. 2017-181908, filed on Sep. 22, 2017. The entirety of each of the above-mentioned patent applications is hereby incorporated by reference herein and made a part of this specification.

TECHNICAL FIELD

The disclosure mainly relates to a radar device having a target tracking function.

RELATED ART

In the related art, a radar device having a function of tracking a target (TT) based on an echo signal received by a radar antenna is known. Patent Literature 1 discloses such a type of radar device.

The radar device disclosed in Patent Literature 1 (Japanese Patent Application Laid-open No. 9-236658) includes a feature extracting means and an information selecting means. The feature extracting means extracts features of a shape of a target which is being tracked (for example, a bearing width and a distance width of a shape of an echo when seen from a host ship) and stores the extracted data. The information selecting means determines whether features of a target which is being tracked and which has been extracted by the feature extracting means match features of a target which is present in a preset window.

In Patent Literature 1, since echo data is selected based on features of a shape with this configuration, an unnecessary echo is not erroneously selected as a target which is an original tracking target.

SUMMARY OF INVENTION

Technical Problem

In a radar device, for example, when ships cross each other or a ship moves in the vicinity of a buoy, a plurality of echoes may merge on a radar image and become one echo in external appearance (hereinafter, this phenomenon may be referred to as "mergence").

In this regard, since the radar device described in Patent Literature 1 selects a tracking target based on features of a shape of an echo, tracking of a target may be normally continuously performed in many cases after echoes are re-separated even when mergence of echoes occurs temporarily. However, when shapes of echoes before mergence are similar to each other, it is difficult to determine what echo out of echoes re-separated after mergence is an echo of a tracking target and there is concern that tracking of an erroneous echo may be started with mergence of echoes as a trigger.

When mergence of a plurality of echoes does not occur, the shape of an echo may change depending on an observation situation or the like. In this case, with the configuration described in Patent Literature 1, there is concern that a tracking target may be lost.

In the following description, a phenomenon in which a tracking target is changed from an echo of a certain target to an echo of another target may be referred to as "transfer" of tracking. A phenomenon in which a tracking target is lost may be referred to as "being lost" in tracking. In Patent Literature 1, there is room for improvement of transfer and being lost being curbed to realize good tracking.

The disclosure is made in consideration of the above-mentioned circumstances and an objective thereof is to provide a radar device that can accurately and stably track a target in consideration of a situation in which a plurality of echoes merges.

Solution to Problem and Advantageous Effects

An objective which is achieved by the invention is the same as described above, and means for achieving the objective and advantageous effects thereof will be described below.

According to a first aspect of the invention, there is provided a radar device having the following configuration. That is, the radar device includes a tracking processing unit, a merging possibility calculating unit, and a preliminary handling processing unit. The tracking processing unit performs a tracking process on an echo which is detected from a reception signal received by an antenna. The merging possibility calculating unit calculates an echo mergence possibility which is a possibility that echo mergence in which a plurality of echoes merges is to occur in the future based on movement information including a position and a velocity of a target. The preliminary handling processing unit performs a preliminary handling process which is a process corresponding to occurrence of the echo mergence in the future based on the echo mergence possibility.

With this configuration, a possibility of echo mergence can be predicted before echo mergence actually occurs, and an appropriate process can be performed preliminarily.

In the radar device, the movement information may be acquired through the tracking process which is performed by the tracking processing unit.

With this configuration, it is possible to acquire movement information with a simple configuration.

In the radar device, the movement information may be acquired based on information which is input from an automatic ship identification system.

With this configuration, it is possible to acquire movement information with a simple configuration.

In the radar device, the preliminary handling process may include a process of changing a control gain of the tracking process which is performed by the tracking processing unit.

With this configuration, for example, when a high possibility of echo mergence is predicted, it is possible to curb transfer and being lost of tracking by preliminarily decreasing sensitivity of the tracking process.

In the radar device, the preliminary handling process may include a process of decreasing responsiveness to a newly detected echo in the tracking process which is performed by the tracking handling processing unit.

With this configuration, by preliminarily decreasing responsiveness to a newly detected echo, it is possible to curb transfer and being lost of tracking after re-separation even when echo mergence occurs.

The radar device may have the following configuration. That is, the tracking processing unit may include a first mode in which the position of the target is acquired based on a newly detected echo and a second mode in which the newly detected echo is ignored and the position of the target is estimated from a result of the previous tracking process. The preliminary handling process may include a process of switching the tracking processing unit from the first mode to the second mode.

With this configuration, by preliminarily performing switching such that the tracking processing unit performs the tracking process in the second mode, it is possible to curb transfer and being lost of tracking after re-separation even when echo mergence occurs.

In the radar device, the preliminary handling process may include a process of changing a threshold value for an intensity of the reception signal when echoes which is gathered in a region are detected from the reception signal.

With this configuration, for example, by preliminarily increasing the threshold value for an intensity of the reception signal, it is possible to make it difficult for echoes which are gathered in a region to merge with other echoes when the echoes get close to each other. Accordingly, it is possible to easily prevent occurrence of echo mergence which serves as a reason for transfer and being lost of tracking.

In the radar device, the preliminary handling process may include a process of changing a threshold value for a noise removing process which is performed on the reception signal.

With this configuration, for example, by preliminarily increasing the threshold value for the noise removing process, it is possible to prevent echoes which are to be treated as being separate from each other from merging with each other due to noise.

In the radar device, the preliminary handling process may include a process of changing a display of an echo in which the echo mergence possibility is equal to or greater than a preset value from a normal display.

With this configuration, a user can preliminarily pay attention to an echo having a high possibility of mergence with another echo in the future. Accordingly, even when transfer or being lost of tracking occurs with mergence of echoes, a user can be aware of it sooner and can perform an appropriate countermeasure therefor.

In the radar device, the preliminary handling process may include a process of changing a display of a tracking symbol associated with an echo in which the echo mergence possibility is equal to or greater than a preset value from normal display.

With this configuration, a user can preliminarily pay attention to a tracking target associated with an echo having a high possibility of mergence with another echo in the future. Accordingly, even when transfer or being lost of tracking occurs with mergence of echoes, a user can be aware of it sooner and can perform an appropriate countermeasure therefor.

The radar device may employ the following configuration. That is, the preliminary handling processing unit may start the preliminary handling process when the echo mergence possibility acquired by the merging possibility calculating unit is greater than a preset determination threshold value. The preliminary handling process may end the preliminary handling process when the echo mergence possibility is less than the preset determination threshold value.

With this configuration, it is possible to prevent the preliminary handling process from being performed also when it is not necessary.

In the radar device, the merging possibility calculating unit may calculate a distance between targets at a closest point of approach based on the movement information and acquire the echo mergence possibility based on the calculated distance at the closest point of approach.

With this configuration, a possibility that echoes which are currently separated from each other will merge with each other in the future can be appropriately evaluated using movement information.

The radar device may employ the following configuration. That is, the merging possibility calculating unit may calculate an estimated time until echo mergence will occur. The preliminary handling processing unit may perform the preliminary handling process based on the echo mergence possibility and the estimated time.

With this configuration, when it is estimated that the time until mergence with a high echo mergence possibility occurs is long, it is possible to more flexibly handle the case such as not performing the preliminary handling process immediately.

According to a second aspect of the invention, there is provided a target tracking method. That is, a tracking process is performed on an echo which is detected from a reception signal received by an antenna. An echo mergence possibility which is a possibility that echo mergence in which a plurality of echoes merges is to occur in the future is calculated based on movement information including a position and a velocity of a target. A preliminary handling process which is a process corresponding to occurrence of the echo mergence in the future is performed based on the echo mergence possibility.

Accordingly, a possibility of echo mergence can be predicted before the echo mergence actually occurs and an appropriate process can be performed preliminarily.

DESCRIPTION OF EMBODIMENTS

Figure 1:
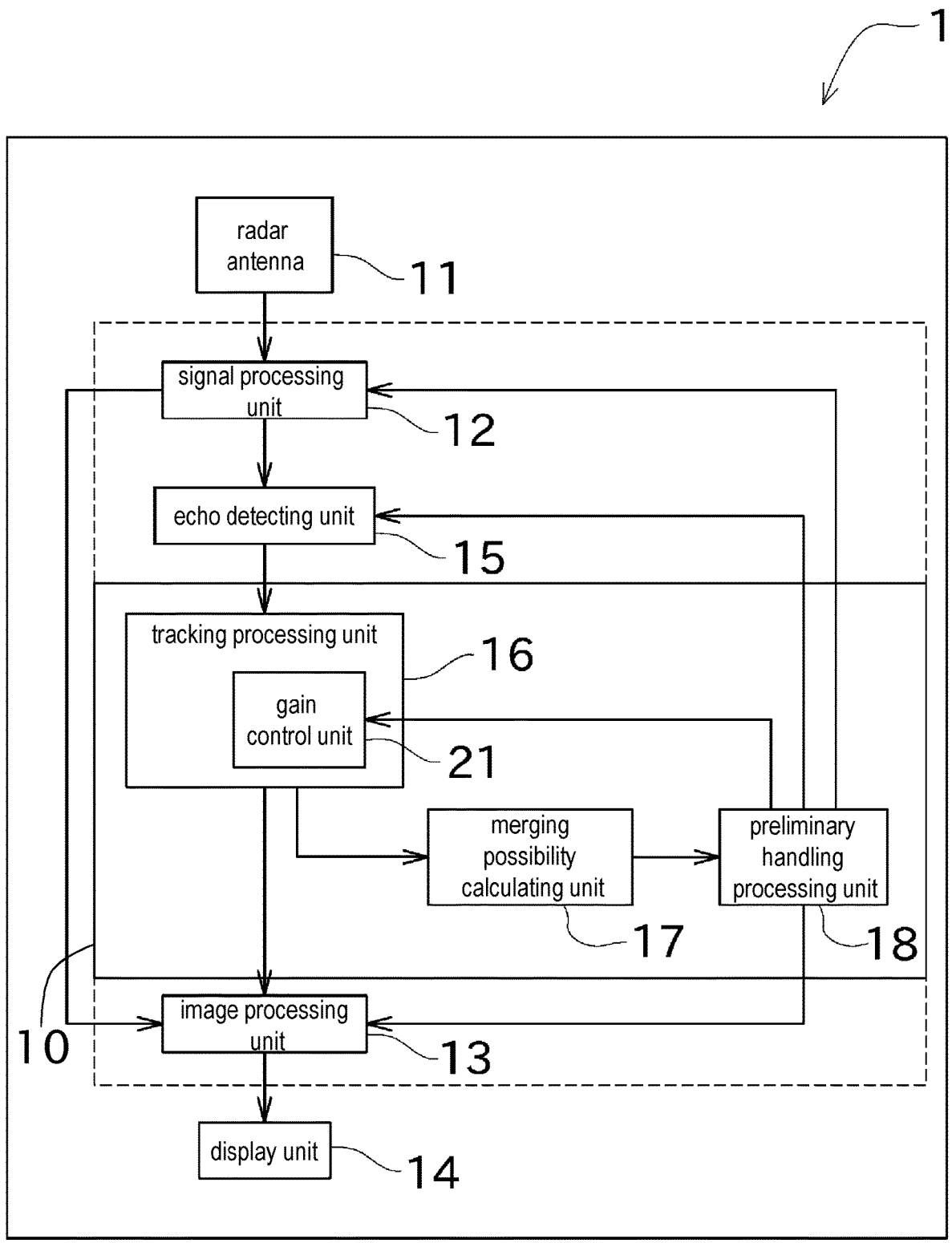
FIG. 1 is a block diagram of a radar device according to an embodiment of the disclosure.

Hereinafter, an embodiment of the disclosure will be described with reference to the accompanying drawings. FIG. 1 is a block diagram of a radar device 1 according to an embodiment of the disclosure.

The radar device 1 illustrated in FIG. 1 is provided in a mobile object such as a ship, and monitors the surroundings of a host ship by radiating radio waves. The radar device 1 includes a radar antenna 11, a signal processing unit 12, an image processing unit 13, a display unit 14, an echo detecting unit 15, a tracking processing unit 16, a merging possibility calculating unit 17, and a preliminary handling processing unit 18. In addition, the radar device 1 may be configured to include a processing circuitry 10, and the processing circuitry 10 at least includes the echo detecting unit 15, the tracking processing unit 16 and the merging possibility calculating unit 17. In one example, the processing circuitry 10 may further includes signal processing unit 12 image processing unit 13 echo detecting unit 15 and a gain control unit 21.

The radar device 1 includes a known computer and includes a CPU, a ROM, and a RAM. A program for realizing a target tracking method according to the disclosure is stored in the ROM. By this cooperation of hardware and software, the radar device 1 can be made to operate as the image processing unit 13, the echo detecting unit 15, the tracking processing unit 16, the merging possibility calculating unit 17, the preliminary handling processing unit 18, and the like.

The radar antenna 11 repeatedly transmits and receives radio waves while rotating in a horizontal plane. The radar device 1 repeatedly performs an operation of transmitting radio waves having strong directivity (for example, pulse-shaped radio waves) as a monitoring signal via the radar antenna 11 and receiving reflected waves which are returned by allowing the monitoring signal to be reflected by a target or the like at intervals of a short time while rotating the radar antenna 11.

In the following description, an operation after a monitoring signal has been transmitted from the radar antenna 11 and before a next monitoring signal is transmitted may be referred to as a sweep. A direction in which radio waves are transmitted and received by the radar antenna 11 at each sweep may be referred to as a distance direction, and a direction in which the radar antenna 11 rotates may be referred to as a bearing direction. An operation of causing the radar antenna 11 to rotate once while repeating sweeps may be referred to as a scan.

The radar device 1 can monitor the surroundings of a host ship by 360° by continuously performing scans.

The signal processing unit 12 detects an analog reception signal which is acquired by causing the radar antenna 11 to receive reflected waves and converts the analog reception signal into digital data by performing A/D conversion on the reception signal.

The signal processing unit 12 performs various processes on the acquired digital data. These processes include a noise removing process of removing noise which makes it difficult to discriminate an echo from a ship or the like. As reasons of noise, for example, internal noise in a radar reception signal which is not illustrated and echoes of rain or snow can be conceived.

The signal processing unit 12 generates digital data and outputs the digital data to the image processing unit 13 and the echo detecting unit 15 whenever a reception signal corresponding to one sweep is input from the radar antenna 11.

The image processing unit 13 generates a radar image which is a two-dimensional image of a raster format. Specifically, the image processing unit 13 includes an image memory, and calculates an address indicating a position (two-dimensional orthogonal coordinates) in the image memory corresponding to an echo included in digital data corresponding to one sweep based on the direction of the radar antenna 11 in each sweep when the digital data is input from the signal processing unit 12. Thereafter, the image processing unit 13 stores a preset color corresponding to intensity of the echo at the position of the calculated address. In this way, a radar image indicating the surrounding situation can be prepared.

The image processing unit 13 prepares a symbol (a tracking symbol) indicating a position and a velocity of a tracking target based on information of the tracking target (target) acquired from the tracking processing unit 16 which will be described later, and performs a process of synthesizing the symbol with the radar image. Accordingly, the image processing unit 13 can generate a synthesized image in which a velocity vector of the tracking target overlaps the radar image. The image processing unit 13 outputs the generated synthesized image to the display unit 14.

The display unit 14 is constituted by a known raster scan type display. The display unit 14 displays the synthetized image input from the image processing unit 13 on a display screen thereof.

The echo detecting unit 15 detects an echo based on the digital data input from the signal processing unit 12.

Specifically, when digital data corresponding to one sweep is input from the signal processing unit 12, the echo detecting unit 15 compares the intensity of a reception signal indicated by the digital data with a preset binarization threshold value, and performs conversion such that the digital data is "1" when the intensity is equal to or greater than the threshold value and "0" otherwise. In a signal acquired through the binarization process, data of "1" represents that there is an echo and data of "0" represents that there is no echo.

The echo detecting unit 15 inspects two-dimensional continuity (that is, continuity in a distance direction and a bearing direction) of the data of "1" in the binarized data and detects a regional unity of echoes. In the following description, echoes which are regionally detected in this way may be referred to as an echo region. The signal processing unit 12 acquires coordinates of a representative point of each unity of the data of "1" (that is, for each echo region) by calculation. The representative point may be determined in any way and can be set to, for example, the center of gravity of a figure indicating an area in which the data of "1" is continuous. The position of the representative point of the acquired echo region substantially indicates a position of a target. The echo detecting unit 15 outputs coordinates of the representative point of each detected echo region to the tracking processing unit 16 whenever a scan is performed.

The tracking processing unit 16 continuously tracks targets based on information on a position of an echo region input from the echo detecting unit 15 and estimates movement information thereof. This movement information includes the position of each target, the moving direction of the target, and the magnitude of the moving velocity thereof.

The tracking processing unit 16 has a known configuration for the TT function and details thereof will not be described. The following process is performed by the tracking processing unit 16.

The tracking processing unit 16 acquires a position which is closest to the current position of the target predicted at the time of the previous scan for a certain tracking target from the targets input from the echo detecting unit 15 in the current scan as a current observed position of the tracking target. Accordingly, the tracking target can be correlated with the position of the target input from the echo detecting unit 15 in the current scan.

Then, the tracking processing unit 16 calculates an estimated position of the tracking target using the estimated position in the previous scan and the observed position acquired in the current scan. At this time, for example, by performing an appropriate smoothing process, for example, using a known $\alpha\beta$ tracker or a Kalman filter to acquire an estimated position, it is possible to stabilize outputting of the position of the tracking target in comparison with a case in which the observed position acquired in the current scan is used without any change.

The tracking processing unit 16 acquires a velocity vector indicating a moving velocity of the tracking target by calculation based on the estimated position acquired in the previous scan and the estimated position acquired in the current scan.

Subsequently, the tracking processing unit 16 predicts a position of a target at a time point of a next scan based on the estimated position acquired in the current scan and the velocity vector. The predicted position is used for a tracking process in the next scan.

The tracking processing unit 16 performs the above-mentioned process on all the tracking targets. The tracking processing unit 16 treats a target which is not correlated with targets tracked in the past out of targets input from the echo detecting unit 15 in the current scan as a new tracking target.

The tracking processing unit 16 can continuously track a target by repeating the above-mentioned process for each scan.

The tracking processing unit 16 outputs an estimated position and a velocity vector in the current scan as the movement information to the image processing unit 13 for each tracking target every scan. The tracking processing unit 16 outputs the movement information of each tracking target to the merging possibility calculating unit 17.

Here, the tracking processing unit 16 is configured to switch between a mode (a first mode) in which a normal tracking process is performed as described above and a mode (a second mode) in which a special tracking process is performed. In the second mode, the tracking processing unit 16 ignores an input of a position of a target from the echo detecting unit 15, considers that the target moves at a constant velocity based on a velocity vector acquired immediately before switching to the second mode, and acquires an estimated position of the target.

The merging possibility calculating unit 17 acquires a possibility of mergence of an echo corresponding to a corresponding tracking target with another echo in the future (hereinafter referred to as an echo mergence possibility) based on movement information of tracking targets input from the tracking processing unit 16, specifically, estimated positions and velocity vectors by calculation.

An echo mergence possibility has only to a possibility of contact between two echoes in the future and various indices can be thought to be used. In this embodiment, an echo mergence possibility is determined using a closest point of approach (CPA) which is a technique of determining a risk of collision between a host ship and another ship using the TT function, or the like.

The CPA is known and detailed description thereof will not be provided. Briefly, the CPA is to acquire a distance at a closest point of approach (a distance at a closest point of approach (DCPA)) which is a point at which another ship is closest to the host ship from a relative position and a relative velocity of the other ship with respect to the host ship, and to determine that there is a high risk of collision when the acquired distance is equal to or less than a preset value.

The CPA technique is to evaluate a risk of collision between the host ship and another ship, and can be applied to evaluation of a possibility of contact (that is, mergence) between the echoes of two targets. That is, when two targets are defined as A and B, a relative position and a relative velocity of the target B with respect to the target A are calculated, a DCPA is calculated therefrom, and it can be determined that there is a high possibility of mergence between the echoes of two targets A and B when the DCPA is less than a preset threshold value.

The merging possibility calculating unit 17 extracts two arbitrary targets from targets input from the tracking processing unit 16, calculates a DCPA, and determines whether there is a high echo mergence possibility based on the acquired DCPA. When it is determined that there is a high echo mergence possibility, the merging possibility calculating unit 17 outputs information on the two targets to the preliminary handling processing unit 18.

Examples of the information on targets which is output from the merging possibility calculating unit 17 to the preliminary handling processing unit 18 include a position and a velocity of each target and an estimated time until echo mergence occurs. A time acquired by dividing a distance from the target B to the closest point of approach by the relative velocity of the target B with respect to the target A (a time to a closest point of approach (TCPA)) can be used as the estimated time.

The merging possibility calculating unit 17 performs the above-mentioned process on all combinations of two targets extracted out of all targets input from the tracking processing unit 16. Accordingly, it is possible to fully detect all pairs of targets with a high echo mergence possibility and to output information on the targets to the preliminary handling processing unit 18.

When information of targets with a high echo mergence possibility is input from the merging possibility calculating unit 17, the preliminary handling processing unit 18 causes the signal processing unit 12, the image processing unit 13, the echo detecting unit 15 and the tracking processing unit 16 to preliminarily perform a special process for handling a situation in which echo mergence may occur.

Specifically, the preliminary handling processing unit 18 performs the processes which are represented below by the processes of (1) to (4) as a handling process before echo mergence occurs.

(1) The preliminary handling processing unit 18 sends a signal to a gain control unit 21 of the tracking processing unit 16 and controls targets with a high echo mergence possibility such that the tracking processing unit 16 performs a tracking process (a tracking process in the second mode) of ignoring the positions of the targets input from the echo detecting unit 15.

Accordingly, the estimated velocity vectors are not updated and tracking is performed on the assumption that the targets move at constant velocities. As a result, it can be said that the gain control unit 21 substantially sets a control gain associated with tracking control which is performed by the tracking processing unit 16 to zero. Accordingly, even when echo mergence actually occurs, it is possible to prevent transfer, being lost, or the like from occurring due to tracking of targets.

(2) The preliminary handling processing unit 18 sends a signal to the image processing unit 13 and controls a radar image which is generated by the image processing unit 13 and output to the display unit 14 such that echoes with a high echo mergence possibility are displayed distinct from normal echoes (for example in different colors). Instead thereof or in addition thereto, symbols indicating positions and velocities of tracking targets may be displayed distinct from normal symbols. Accordingly, a user can preliminarily pay attention to echoes with a high echo mergence possibility. As a result, even when echo mergence actually occurs and transfer of tracking or the like occurs therewith, a user can be aware of it sooner and take appropriate measures.

(3) The preliminary handling processing unit 18 sends a signal to the signal processing unit 12 and controls digital data of a reception signal when the vicinity of targets with a high echo mergence possibility is monitored, for example, such that a threshold value which is used for the noise removing process increases. Accordingly, even when a plurality of echoes gets close to each other, noise including noise in which echoes are connected is more strongly removed and thus it is possible to prevent mergence of echoes.

(4) The preliminary handling processing unit 18 sends a signal to the echo detecting unit 15 and controls digital data of a reception signal when the vicinity of targets with a high echo mergence possibility is monitored, for example, such that a threshold value for signal intensity when the binarization process is performed increases. Accordingly, even when a plurality of echoes actually gets close to each other, "0" representing that there is no echo is likely to appear between areas in which "1" is continuous corresponding to two echoes. Accordingly, in a state in which echoes are separated from each other well, the echoes can be tracked by the tracking processing unit 16.

The configuration in which the preliminary handling processing unit 18 performs all the processes of (1) to (4) is an example and any one process can be omitted depending on the situation. The processes may be changed.

For example, in the process (1), the first mode is maintained by the tracking processing unit 16 without performing a tracking process in the second mode, but the gain control unit 21 may perform control for decreasing a position smoothing constant α and a velocity smoothing constant β in the αβ tracker which is used to estimate positions of targets. In this case, it is possible to decrease responsiveness to the currently observed position of a tracking target and to substantially change the control gain.

For example, instead of displaying an echo in a different color in the process of (2), in a region with an appropriate size including the echo, an image process such as sharpening is considered to be performed on a radar image. Accordingly, since the outline of each echo displayed on the display unit 14 becomes clear, the echoes are likely to seem to be separated from each other.

After a preset time has elapsed after the preliminary handling process has been started, the preliminary handling processing unit 18 ends the process flow and returns the process to the original state. A time in which the preliminary handling process is continuously performed can be set to a time obtained by adding a preset margin to an estimated time until echo mergence occurs which is input from the merging possibility calculating unit 17. Accordingly, it is possible to reliably continuously perform the preliminary handling process up to a time at which echo mergence may occur.

In a certain situation, the echo mergence possibility may decrease and become less than a preset determination threshold value after the echo mergence possibility has become equal to or greater than the preset determination threshold value and the preliminary handling process has been started and before the preset time has elapsed. In this case, the preliminary handling process can end even before the preset time has elapsed. Accordingly, it is possible to prevent the preliminary handling process from being continuously performed even in an unnecessary case.

When the estimated time until echo mergence occurs is considerably long and the preliminary handling process is performed immediately, the process time is too soon, which may not be appropriate rather. Therefore, when the echo mergence possibility is equal to or greater than a preset determination threshold value and the estimated time is less than a preset threshold value, the preliminary handling processing unit 18 may perform the preliminary handling process. In this way, in consideration of time conditions, it is possible to perform the preliminary handling process at an appropriate time.

Figure 2:
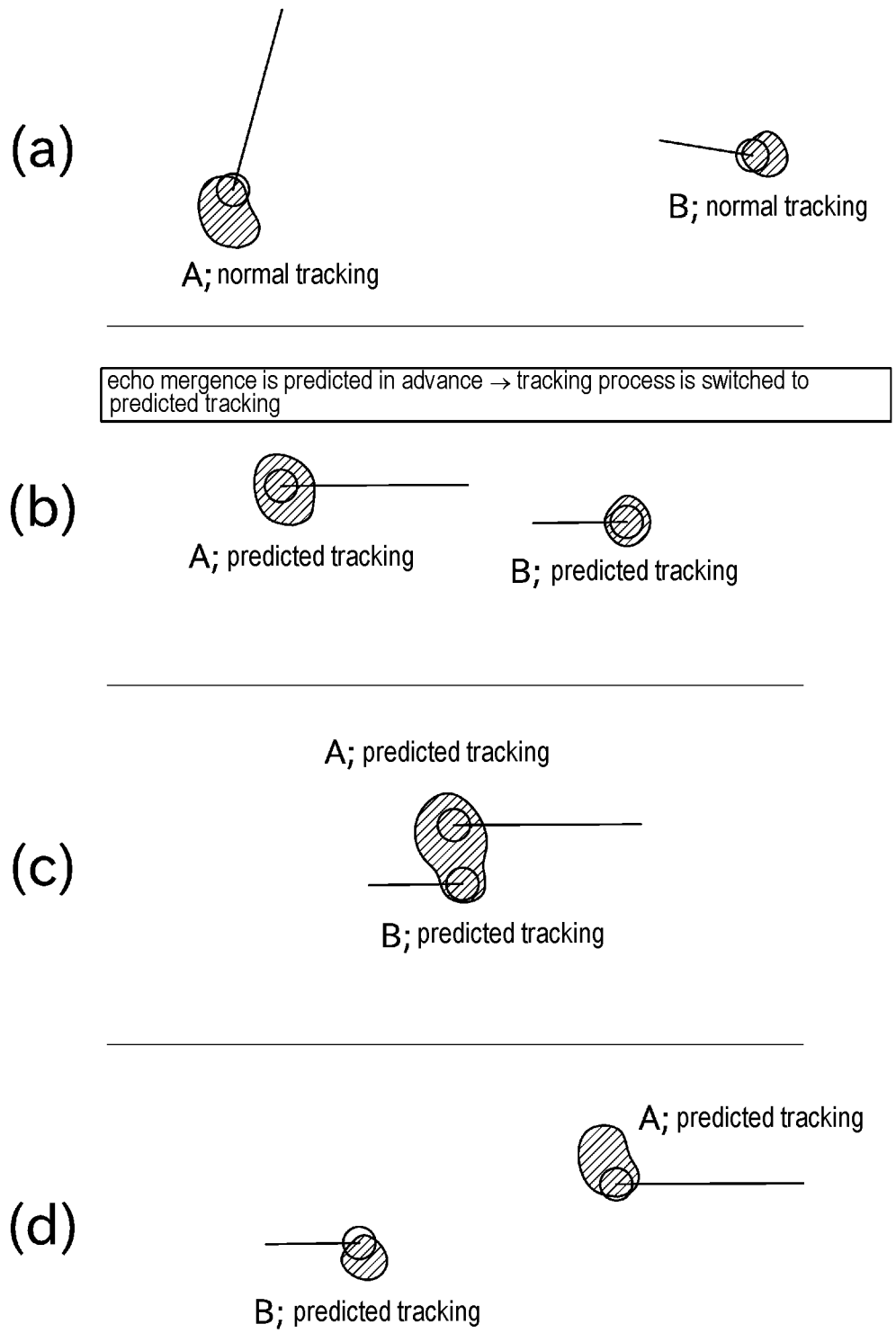
FIG. 2 is a diagram schematically illustrating detection of an echo mergence possibility and a preliminary handling process which are performed by the radar device.

Advantageous effects when a preliminary process associated with tracking of a target according to the disclosure is performed will be described below regarding an example in which two targets cross each other as illustrated in FIG. 2.

FIG. 2 is a diagram schematically illustrating detection of an echo mergence possibility and a preliminary handling process in the radar device 1.

(a) of FIG. 2 illustrates an example in which two targets A and B which are ships are tracked by the tracking processing unit 16 of the radar device 1. In FIG. 2, a hatched figure indicates an echo. The tracking symbol is displayed to overlap the echo of each target. In the tracking symbol, the estimated velocity vector of each target acquired by the tracking processing unit 16 is illustrated as a straight line.

When a slight time elapses from e state illustrated in (a) of FIG. 2 and a course of each ship is changed, it is assumed that the moving directions of the two targets A and B change and the estimated velocity vectors acquired by the tracking processing unit 16 change as illustrated in (b) of FIG. 2.

At the time point illustrated in (b) of FIG. 2, the echo mergence possibility calculated by the merging possibility calculating unit 17 increases greatly. Therewith, the preliminary handling processing unit 18 can predict that echoes may merge and perform a preliminary handling process.

Specifically, until an appropriate time elapses from the state illustrated in (b) of FIG. 2, the tracking processing unit 16 ignores a position and a shape of a newly detected echo and acquires positions of the targets A and B from the estimated velocity vectors acquired at the time point illustrated in (b) of FIG. 2 by calculation. In other words, the tracking processing unit 16 performs tracking based on prediction using the velocity vectors acquired previously (more specifically, before it is determined that there is a high echo mergence possibility). Accordingly, even when echo mergence actually occurs as illustrated in (c) of FIG. 2, correct tracking in which transfer does not occur can be continuously performed on the echoes which have been re-separated as illustrated in (d) of FIG. 2.

As described above, the radar device 1 according to this embodiment includes the tracking processing unit 16, the merging possibility calculating unit 17, and the preliminary handling processing unit 18. The tracking processing unit 16 performs a tracking process on echoes detected from a reception signal which is received by the radar antenna 11. The merging possibility calculating unit 17 calculates an echo mergence possibility which is a possibility that echo mergence in which a plurality of echoes merges will occur in the future based on movement information including positions and velocities of targets. The preliminary handling processing unit 18 performs a preliminary handling process which is a process corresponding to occurrence of echo mergence in the future based on the echo mergence possibility.

In the radar device 1 according to this embodiment, tracking of targets is performed using the following method. That is, a tracking process is performed on echoes detected from a reception signal which is received by the radar antenna 11. An echo mergence possibility which is a possibility that echo mergence in which a plurality of echoes merges will occur in the future is calculated based on movement information including positions and velocities of targets. A preliminary handling process which is a process corresponding to occurrence of echo mergence in the future is performed based on the echo mergence possibility.

Accordingly, before echo mergence actually occurs, a possibility thereof can be calculated and an appropriate process depending on the predicted echo mergence possibility can be performed.

While an exemplary embodiment of the disclosure has been described above, the above-mentioned configuration can be modified, for example, as described below.

In the radar device 1 according to the embodiment, movement information of a tracking target (a target) is acquired through the tracking process which is performed by the tracking processing unit 16, but movement information of a tracking target may be acquired by an automatic ship identification system (AIS). That is, the radar device 1 can be configured to include an AIS information acquiring unit in addition to the tracking processing unit 16 such that the AIS information acquiring unit acquires positions and velocities of other ships. Since positions and velocities of other ships included in the AIS information are based on the earth, the AIS information acquiring unit converts the positions and velocities to relative positions and relative velocities with respect to the host ship and outputs the converted information as the movement information to the merging possibility calculating unit 17. With this configuration, the merging possibility calculating unit 17 can calculate the echo mergence possibility and an appropriate process can be performed based on the acquired possibility.

The radar device 1 is not limited to a radar for a ship, and may be, for example, a radar that is installed, for example, in a harbor or a lighthouse and monitor, for example, a position of a mobile object.

The tracking processing unit 16 may be configured to store features such as a shape of a tracking target and to perform the preliminary handling process while determining whether it is suitable for the features.

In the above-mentioned embodiment, the radar device 1 is constituted by a pulse radar, but the radar device 1 may be, for example, a continuous wave (CW) radar or a pulse Doppler radar.

What is claimed is:

1. A radar device comprising:
   an antenna configured to repeatedly transmit and receives radio waves while rotating in a horizontal plane; and
   processing circuitry configured:
   to perform a tracking process on an echo which is detected from a reception signal received by the antenna;
   to calculate an echo mergence possibility which is a possibility that echo mergence in which a plurality of echoes merges is to occur in the future based on movement information including a position and a velocity of a target; and
   to perform a preliminary handling process which is a process corresponding to occurrence of the echo mergence in the future based on the echo mergence possibility,
   wherein the processing circuitry is configured to
   calculate a distance between targets at a closest point of approach based on the movement information;
   calculate the echo mergence possibility based on the calculated distance at the closest point of approach;
   calculate a time to the closest point of approach based on the movement information;
   calculate an estimated time until echo mergence occurs based on the time to the closest point of approach; and
   perform the preliminary handling process based on the echo mergence possibility and the estimated time.

2. The radar device according to claim 1, wherein the movement information is acquired through the tracking process which is performed by the processing circuitry.

3. The radar device according to claim 2, wherein the preliminary handling process includes a process of changing a control gain of the tracking process which is performed by the processing circuitry.

4. The radar device according to claim 3, wherein the preliminary handling process includes a process of decreasing responsiveness to an other echo detected after the echo in the tracking process which is performed by the processing circuitry.

5. The radar device according to claim 3, wherein the processing circuitry includes a first mode in which the position of the target is acquired based on an other echo detected after the echo and a second mode in which the other echo is ignored and the position of the target is estimated from a result of the previous tracking process, and
   wherein the preliminary handling process includes a process of switching the processing circuitry from the first mode to the second mode.

6. The radar device according to claim 1, wherein the movement information is acquired based on information which is input from an automatic ship identification system.

7. The radar device according to claim 6, wherein the preliminary handling process includes a process of changing a control gain of the tracking process which is performed by the processing circuitry.

8. The radar device according to claim 7, wherein the preliminary handling process includes a process of decreasing responsiveness to an other echo detected after the echo in the tracking process which is performed by the processing circuitry.

9. The radar device according to claim 7, wherein the processing circuitry includes a first mode in which the position of the target is acquired based on an other echo detected after the echo and a second mode in which the other echo is ignored and the position of the target is estimated from a result of the previous tracking process, and
   wherein the preliminary handling process includes a process of switching the processing circuitry from the first mode to the second mode.

10. The radar device according to claim 1, wherein the preliminary handling process includes a process of changing a control gain of the tracking process which is performed by the processing circuitry.

11. The radar device according to claim 10, wherein the preliminary handling process includes a process of decreasing responsiveness to an other echo detected after the echo in the tracking process which is performed by the processing circuitry.

12. The radar device according to claim 10, wherein the processing circuitry includes a first mode in which the position of the target is acquired based on an other echo detected after the echo and a second mode in which the other echo is ignored and the position of the target is estimated from a result of the previous tracking process, and
   wherein the preliminary handling process includes a process of switching the processing circuitry from the first mode to the second mode.

13. The radar device according to claim 1, wherein the preliminary handling process includes a process of changing a threshold value for an intensity of the reception signal when echoes which are gathered in a region are detected from the reception signal.

14. The radar device according to claim 1, wherein the preliminary handling process includes a process of changing a threshold value for a noise removing process which is performed on the reception signal.

15. The radar device according to claim 1, wherein the preliminary handling process includes a process of changing a display of the echo in which the echo mergence possibility is equal to or greater than a preset value.

16. The radar device according to claim 1, wherein the preliminary handling process includes a process of changing a display of a tracking symbol associated with an echo in which the echo mergence possibility is equal to or greater than a preset value.

17. The radar device according to claim 1, wherein the processing circuitry
   starts the preliminary handling process when the echo mergence possibility acquired by the processing circuitry is greater than a preset determination threshold value, and
   ends the preliminary handling process when the echo mergence possibility is less than the preset determination threshold value.

18. A target tracking method comprising:
   performing a tracking process on an echo which is detected from a reception signal received by an antenna;
   calculating an echo mergence possibility which is a possibility that echo mergence in which a plurality of echoes merges is to occur in the future based on movement information including a position and a velocity of a target;
   performing a preliminary handling process which is a process corresponding to occurrence of the echo mergence in the future based on the echo mergence possibility;
   calculating a distance between targets at a closest point of approach based on the movement information;
   calculating the echo mergence possibility based on the calculated distance at the closest point of approach;
   calculating a time to the closest point of approach based on the movement information;
   calculating an estimated time until echo mergence occurs based on the time to the closest point of approach; and
   performing the preliminary handling process based on the echo mergence possibility and the estimated time.

* * * * *